United States Patent
Cohen et al.

(10) Patent No.: US 6,925,165 B2
(45) Date of Patent: Aug. 2, 2005

(54) CALL SELECTION BASED ON CONTINUUM SKILL LEVELS IN A CALL CENTER

(75) Inventors: Richard Alan Cohen, Wayland, MA (US); Robin H. Foster, Little Silver, NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 561 days.

(21) Appl. No.: 09/219,995

(22) Filed: Dec. 23, 1998

(65) Prior Publication Data

US 2002/0067822 A1 Jun. 6, 2002

(51) Int. Cl.[7] .............................................. H04M 3/00
(52) U.S. Cl. ................................... 379/265; 379/265.02
(58) Field of Search ................................ 379/265, 266, 379/309

(56) References Cited

U.S. PATENT DOCUMENTS

| 5,206,903 A | * | 4/1993 | Kohler et al. ................ 379/309 |
| 6,163,607 A | * | 12/2000 | Bogart et al. ................ 379/266 |
| 6,173,053 B1 | * | 1/2001 | Bogart et al. ................ 379/266 |

FOREIGN PATENT DOCUMENTS

| EP | 0 740 450 A2 | 10/1996 |
| EP | 0 855 826 A2 | 7/1998 |
| EP | 0 949 793 A1 | 10/1999 |
| EP | 0 982 917 A1 | 3/2000 |
| WO | WO 99/00966 | 1/1999 |
| WO | WO 99/03248 | 1/1999 |

* cited by examiner

Primary Examiner—Ahmad F. Matar
Assistant Examiner—Hector Agdeppa
(74) Attorney, Agent, or Firm—Ryan, Mason & Lewis, LLP

(57) ABSTRACT

A call selection process in a call center is configured to utilize a continuum of skill levels, in one or more categories, for a given multi-skill agent. In an illustrative embodiment, categories of levels are associated with skills supported by the given agent, with each of the categories including a level, e.g., a numerical value, for each of the skills. The levels are used in a call selection computation that determines which of a number of waiting calls should be delivered to the agent. The categories may include, for example, a speed category including levels indicative of the speed at which the agent can process calls for each of the corresponding skills, a yield category including levels indicative of results likely to be obtainable by the agent for each of the corresponding skills, and a preference category including levels indicative of preferences of the agent for calls requiring each of the corresponding skills. The process may involve selecting different subsets of one or more of the categories in a given set of categories for use at different times, depending on factors such as call volume. The call selection computation may involve, for example, computing a value for each of the skills, as a function of the corresponding level or levels and a wait time measure, e.g., a current wait time, a predicted wait time, or a ratio of predicted wait time to a service objective, for a call in a corresponding skill queue.

24 Claims, 2 Drawing Sheets

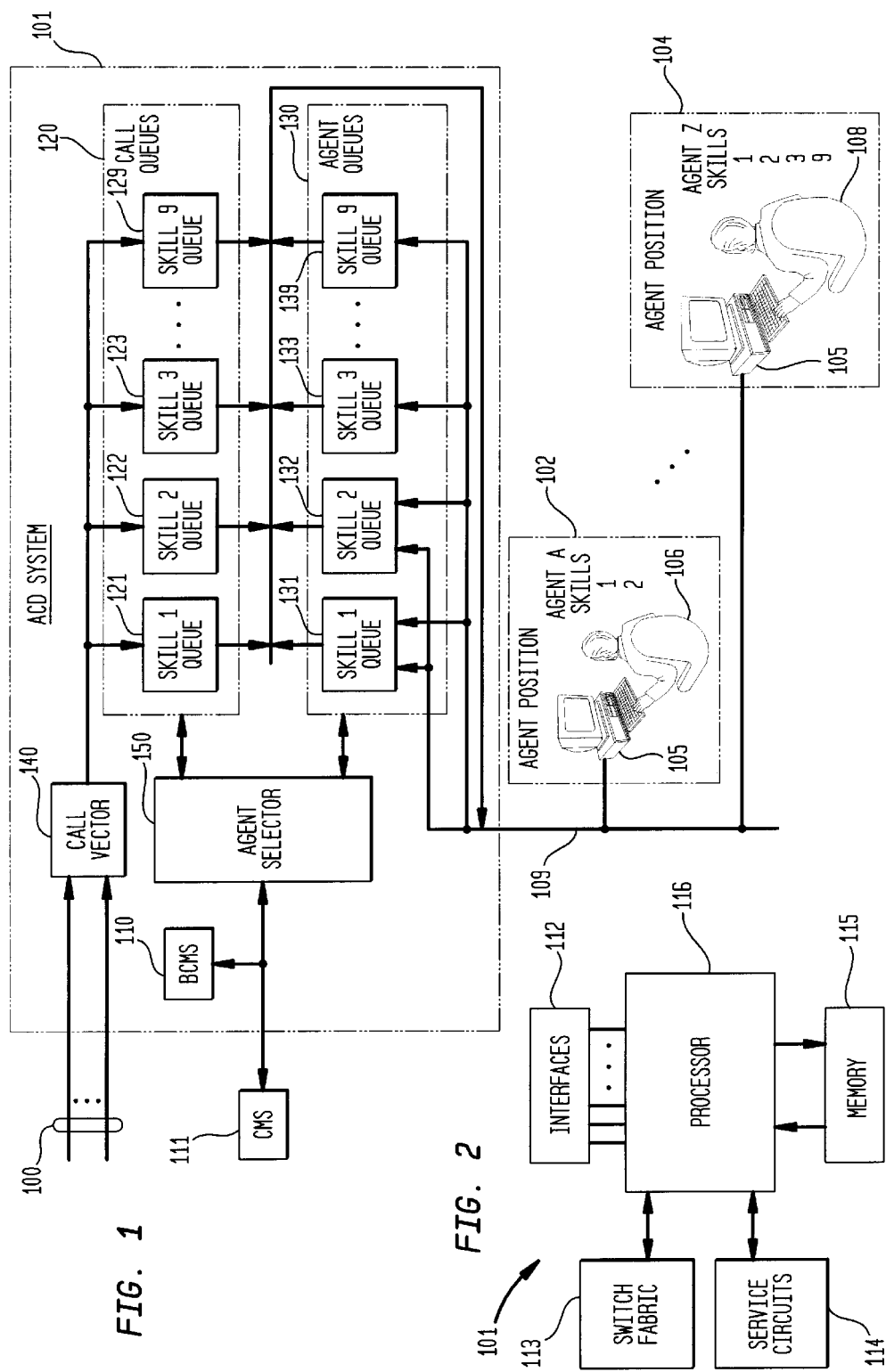

FIG. 3

AGENT INFORMATION

| SKILL | SPEED | YIELD | PREFERENCE |
|---|---|---|---|
| SALES | 1.1 | 1.1 | 1 |
| VIP SALES | 1.1 | 1.2 | 1.1 |
| SERVICE | 0.9 | 1 | 0.9 |
| VIP SERVICE | 0.8 | 1 | 0.8 |

FIG. 4

| SKILL | PWT OF CALL | SO OF SKILL | LEVEL | CONSIDER | (PWT/SO) | CALL SELECTED |
|---|---|---|---|---|---|---|
| SALES | 32 | 20 | 2 | NO | | |
| VIP SALES | 12 | 10 | 1 | YES | (12/10) | =1.2 |
| SERVICE | 35 | 40 | 2 | NO | | |
| VIP SERVICE | 30 | 20 | 1 | YES | (30/20) | =1.5 |

FIG. 5

| SKILL | PWT OF CALL | SO OF SKILL | SPEED (S) | YIELD (Y) | PREFERENCE (P) | (PWT/SO) | (PWT/SO) xSxY | CALL SELECTED |
|---|---|---|---|---|---|---|---|---|
| SALES | 32 | 20 | 1.1 | 1.1 | 1 | 32/20=1.6 | (32/20) x 1.1x1.1 | =1.936 |
| VIP SALES | 12 | 10 | 1.1 | 1.2 | 1.1 | 12/10=1.2 | (12/10) x 1.1x1.2 | =1.584 |
| SERVICE | 35 | 40 | 0.9 | 1 | 0.9 | 35/40=0.875 | (35/40) x 0.9x1 | =0.7875 |
| VIP SERVICE | 30 | 20 | 0.8 | 1 | 0.8 | 30/20=1.5 | (30/20) x 0.8x1 | =1.200 |

FIG. 6

| SKILL | PWT OF CALL | SO OF SKILL | SPEED (S) | YIELD (Y) | PREFERENCE (P) | (PWT/SO) | (PWT/SO) xSxY | CALL SELECTED |
|---|---|---|---|---|---|---|---|---|
| SALES | 32 | 20 | 1.1 | 1.1 | 1 | 32/20=1.6 | (32/20) x 1 | =1.6 |
| VIP SALES | 12 | 10 | 1.1 | 1.2 | 1.1 | 12/10=1.2 | (12/10) x 1.1 | =1.32 |
| SERVICE | 35 | 40 | 0.9 | 1 | 0.9 | 35/40=0.875 | (35/40) x 0.9 | =0.7875 |
| VIP SERVICE | 30 | 20 | 0.8 | 1 | 0.8 | 30/20=1.5 | (30/20) x 0.8 | =1.200 |

CALL SELECTION BASED ON CONTINUUM SKILL LEVELS IN A CALL CENTER

FIELD OF THE INVENTION

The invention relates generally to call centers or other call processing systems in which voice calls or other types of communications are distributed among a number of service agents for handling, and more particularly to agent skill definitions in such call processing systems.

BACKGROUND OF THE INVENTION

Call centers distribute calls and other types of communications to available call-handling service agents in accordance with various predetermined criteria. In existing call centers, the criteria for handling a call are often programmable by the operator of the call center via a capability known as call vectoring. Typically, when the call center detects that an agent has become available to handle a call, the call center identifies the call-handling skills of the agent, usually in some order of priority, and delivers to the agent the longest-waiting call that matches the agent's highest-priority skill. Most conventional call distribution techniques generally focus on being "fair" to callers and agents. This fairness is reflected by the standard first-in, first-out call queuing and most-idle-agent call assignment process. The above-noted skills-based queuing improves upon this basic process in that it allows each agent to be placed into a number of different service categories based on the skill types supported by that agent.

Existing call centers, such as the DEFINITY® call center from Lucent Technologies, can be configured to allow agent skills to be associated with proficiency levels. Calls centers may utilize these skill proficiency levels in call selection and agent selection processes, in order to skew the use of a given agent toward the types of calls that are queued for that agent's most proficient skills. In conventional systems, such skill proficiency levels may be based, for example, on an agent performing a particular task faster or with better revenue results, or on an agent's preference for a particular type of work over other types of work. These factors are referred to as speed, yield and preference, respectively. By way of example, a given agent may have several skills, with the skills spread over a number of different proficiency levels or each set at a unique proficiency level. When this agent becomes available to take a call, a conventional call center may, e.g., determine if there are any calls waiting for the skill(s) at the highest, i.e., best, proficiency level. If two or more of such calls are found, then a decision is made as to which one the agent should take. If no such calls are found, the call center looks at the next lower level of proficiency, and the process continues sequentially until a call is found for the agent to take.

A significant drawback of the above-described conventional process is that it takes a "lock-step" approach to consideration of skill proficiency levels for individual agents. As a result, no call at a lower proficiency level is considered for the given agent, regardless of factors such as the priority of the call, the urgency of the call, the elapsed wait time for the call, or the amount of time the call is expected to continue to wait. A possible alternative approach is for the call center to disregard issues of individual agent proficiency altogether. In this case, the call center can examine all of the agent skills simultaneously in order to identify the agent to receive the next call. If an agent is slower or faster on a particular type of call, or if an agent generates more or less revenue on a particular type of call, or is less or more eager to take a particular type of call, these factors are ignored. Unfortunately, this alternative fails to obtain the benefits otherwise associated with the use of skill proficiency levels.

SUMMARY OF THE INVENTION

The invention provides methods and apparatus for implementing a selection process in a call processing system, i.e., a call center. In accordance with the invention, a call selection process in a call center is configured to utilize a continuum of skill levels, in one or more categories, for a given multi-skill agent. In an illustrative embodiment of the invention, categories of levels are associated with skills supported by the given agent, with each of the categories including a level, e.g., a numerical value, for each of the skills. The levels are then used in a call selection computation that determines which of a number of waiting calls should be delivered to the agent. Categories which may be used in accordance with the invention include, for example, a speed category with levels indicative of the speed at which the agent can process calls for each of the corresponding skills, a yield category with levels indicative of results likely to be obtainable by the agent for each of the corresponding skills, and a preference category with levels indicative of preferences of the agent for calls requiring each of the corresponding skills. Other categories may also be used. In addition, the selection process may involve selecting different subsets of one or more of the categories for use at different times, depending on factors such as call volume. The call selection computation may involve, for example, computing a value for each of the skills, as a function of the corresponding level or levels and a wait time measure, e.g., a current wait time, a predicted wait time, or a ratio of predicted wait time to a service objective, for a call in a corresponding skill queue. Many other types of computation involving the levels may be used in alternative embodiments.

Advantageously, the invention provides the ability to incorporate categories of levels, e.g., agent proficiency levels and preference levels, into a call selection or agent selection process while also permitting a call center to look across all skills simultaneously for a given agent. The invention thus avoids the problems associated with the above-noted conventional "lock-step" approach in which there is a sequential consideration of calls at a first level, then at a second level, and so on until a call is found for the given agent. These and other features and advantages of the present invention will become more apparent from the accompanying drawings and the following detailed description.

BRIEF DESCRIPTION OF THE DRAWINGS

FIG. 1 is a block diagram of a call center that incorporates an illustrative embodiment of the invention.

FIG. 2 is a block diagram of the automatic call distribution (ACD) system implemented in the call center of FIG. 1.

FIG. 3 is an example of a set of skill assignments for a given agent in the FIG. 1 call center.

FIG. 4 illustrates the manner in which a conventional call selection process operates using the example set of skill assignments of FIG. 3.

FIGS. 5 and 6 illustrate the manner in which a call selection process in accordance with the invention may operate using the example set of skill assignments of FIG. 3.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. The term "call center" as used herein is thus intended to include any type of ACD system, telemarketing system or other communication processing system which processes calls or other service requests, including voice calls, video calls, multimedia calls, e-mail, faxes or voice messages as well as various combinations of these and other types of communications.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric and to provide automatic call distribution functionality.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels. Call vectoring is described in greater detail in Definity® Communications System Generic 3 Call Vectoring/Expert Agent Selection (EAS) Guide, AT&T Publication No. 555-230-520, Issue 3, November 1993, which is incorporated by reference herein. Skills-based ACD techniques are described in greater detail in, for example, U.S. Pat. No. 5,206,903, which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system. Further details regarding call processing in a system such as ACD system 101 can be found in, for example, U.S. patent application Ser. No. 08/813,513 filed Mar. 7, 1997 and entitled "Waiting Call Selection Based on Anticipated Wait Times," and U.S. patent application Ser. No. 09/022,959 filed Feb. 12, 1998 and entitled "Call Center Agent Selection that Optimizes Call Wait Times," both of which are incorporated by reference herein.

In accordance with the invention, the call center of FIG. 1 includes a capability for adjusting a call selection process based on a continuum of skill levels. As will be described below, the invention in an illustrative embodiment provides the ability to incorporate one or more categories of skill levels into a call selection process while also permitting a call center to look across all skills simultaneously. The invention thereby avoids the problems associated with the above-noted conventional "lock-step" approach in which there is a sequential consideration of calls at a first level, then at a second level, and so on until a call is found. In the illustrative embodiment, one or more categories are enabled for each skill. For example, one category may reflect technical proficiency, i.e., speed of working, another may reflect revenue or customer satisfaction proficiency, i.e., yield, and another could reflect a given agent's preference for using a particular skill. Levels associated with each of the categories are indicated by a number in the illustrative embodiment.

FIG. 3 shows an example of a set of skill assignments for a given multi-skill agent. The agent in this example has four skills: sales, VIP sales, service and VIP service. Three categories of levels, i.e., a speed category, a yield category and a preference category, are included for the set of skills. In each of the categories, a particular skill level, in the form of a numerical value, is associated with each of the skills. For example, for the VIP service skill, this agent has a speed level of 0.8, a yield level of 1.0 and a preference level of 0.8. At any time that the agent becomes available for the next call, there may be calls waiting for one of more of the four skills. If calls are waiting for two or more of the these skills, a decision must be made as to which call the agent should take. Factors such as current wait time, predicted wait time (PWT) and service objective (SO) may play a role in this process. For example, in a conventional call center, when a multi-skill agent becomes available, a "greatest need" type call selection process may select a call by examining the PWTs of the calls at the head of the queues for the skills that the multi-skill agent can handle, and then comparing the PWTs of the calls to an SO identified for the skills. It will be assumed that in the illustrative embodiment of the invention, the call center is using PWT and SO in the call selection process, e.g., a ratio of PWT to SO is computed for each call, and the call with the highest ratio is selected. It should be understood, however, that the call selection process need not be of any particular type in order to benefit from the techniques of the invention. It will also be assumed without limitation that in the illustrative embodiment, one or more of the functions described below are computed by processor 116 of ACD 101 operating in conjunction with memory 115 to execute appropriate stored program instructions.

In the illustrative embodiment of the invention, the FIG. 3 skill levels for the speed, yield and preference categories may be taken account, e.g., in a multiplicative fashion, either individually or in combination, in determining which call is to be handled next for a given agent. FIG. 4 illustrates the call selection process for a case in which the VIP sales and VIP service skills are held at the highest level of a conventional "lock-step" skill level process, i.e., level 1, and the sales and service skills are held at the next lower level, i.e., level 2. It is assumed for this example that calls are waiting for each of the four skills. In this case, sales and service calls, even though they are waiting, are not considered for selection because calls at a higher skill level are waiting. The selection therefore immediately narrows to choosing between the VIP sales calls and the VIP service calls. In this particular example, the VIP service call has a larger PWT/SO ratio than the VIP sales call, and is therefore selected for delivery to the agent. It can be seen that in this conventional "lock-step" call selection process, calls are not considered across all of the skill levels supported by the multi-skill agent.

FIGS. 5 and 6 illustrate call selection utilizing the techniques of the invention to look across all skills for a given multi-skill agent, using a continuum of levels for the categories of speed, yield and preference. The FIG. 5 and FIG. 6 examples each include the same skills, the same PWT values, the same SO values and thus the same PWT/SO ratios as the FIG. 4 example. However, as will be shown below, by taking into account calls across all skill levels for the given agent, the invention can result in selection of a different, more appropriate call than the conventional "lock-step" approach. In the FIG. 5 example, speed and yield levels are taken into account for the agent, but not agent preference levels. For each of the skills, a value is computed by multiplying the PWT/SO ratio for the calls needing that skill by the speed (S) level and the yield (Y) level of the agent. For example, for the VIP service call, the PWT/SO ratio is 1.5, which is multiplied by S=0.8 and Y=1.0, resulting in a value of 1.20. Similarly, for a VIP sales call, the PWT/SO ratio is 1.2, which is multiplied by S=1.1 and Y=1.2, resulting in a value of 1.584. However, for a sales call, the PWT/SO ratio is 1.6, which is multiplied by S=1.1 and Y=1.1, resulting in a value of 1.936. Therefore, in the FIG. 5 example, the sales call is selected for the given agent over the VIP sales and VIP service calls. In the FIG. 6 example, only an agent preference level is taken into account, while the speed and yield levels are ignored. Again, the selected call is the sales call, because its PWT/SO ratio multiplied by its preference level results in the largest value among the values computed for the four skills.

A determination as to which categories, e.g., speed, yield, preference or others, to include in the call selection process may be based on the current call performance statistics of the call center. For example, when the center is overloaded, agent preference may be eliminated from consideration. In some cases of overload, agent speed may be the only important criteria, as the goal might be to keep agents close to the work they can perform the fastest. When the center is not overloaded, yield and preference may be the most important criteria. The invention could be implemented in an administrative software tool that would, e.g., analyze individual call records, transaction records, etc., to determine how agents rank on a given skill with respect to any one of the level categories, e.g., speed, yield and preference, and then assign levels automatically or guide a user in assigning them.

A call selection function in accordance with the invention may be implemented using one or more of the elements of the ACD system 101, such as, for example, the agent selector 150. More generally, the call processing based on a continuum of skill levels may be implemented by processor 116 of FIG. 2 using program instructions and other information stored in the memory 115. In other embodiments of the invention, other elements of the FIG. 1 call center or any other type of call center may be used to provide call selection which utilizes a continuum of skill levels as part of a computation used to select a call for delivery to a given agent.

The above-described embodiments of the invention are intended to be illustrative only. For example, the invention may establish a continuum of levels for other categories, i.e., other than the speed, yield and preference categories used in the illustrative embodiment. Other wait time measures, e.g., a current wait time, predicted wait time, or other measures, could be used in place of the ratio of predicted wait time to service objective of FIGS. 4–6. Also, although illustrated in conjunction with a call selection process, the techniques of the invention can also be applied to other processes, e.g., agent selection processes. It should also be noted that the exemplary configuration of the call center shown in FIG. 1 may be altered to incorporate a wide variety of different arrangements of components to provide the selection functions described herein. In addition, as previously noted, the invention can be applied to a wide variety of communications other than calls, including faxes and e-mails. The categories, levels, service objectives and other call selection information described above may be, for example, determined and implemented administratively, or through a computer-telephony integration (CTI) application. As another example, the invention can be implemented in an applications programming interface (API) with an existing call center software package.

Furthermore, it should be noted that the invention may be implemented in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A variety of other implementations may also be used to provide call selection in accordance with the invention. These and numerous other alternative embodiments within the scope of the following claims will be apparent to those skilled in the art.

What is claimed is:

1. A method of controlling a selection process for communications in a call center, the method comprising the steps of:
    associating at least one category of levels with a plurality of skills supported by a given agent in the call center, the category including a level for each of at least a subset of the plurality of skills; and
    selecting a communication for handling by the agent based at least in part on a computation involving at least one of the levels.

2. The method of claim 1 wherein the category of levels includes a speed category including levels indicative of the speed at which the agent can process calls for each of the corresponding skills.

3. The method of claim 1 wherein the category of levels includes a yield category including levels indicative of results likely to be obtainable by the agent for each of the corresponding skills.

4. The method of claim 1 wherein the category of levels includes a preference category including levels indicative of preferences of the agent for calls requiring each of the corresponding skills.

5. The method of claim 1 wherein the associating step includes associating a plurality of different categories of levels with the plurality of skills supported by the agent.

6. The method of claim 1 wherein the selecting step includes the step of computing a value for each of at least a subset of the plurality of skills, as a function of the corresponding level and a wait time measure for a call in a corresponding skill queue.

7. The method of claim 6 wherein the wait time measure for the call is a current wait time for the call.

8. The method of claim 6 wherein the wait time measure for the call is a predicted wait time for the call.

9. The method of claim 6 wherein the wait time measure for the call is a ratio of a predicted wait time for the call to a service objective for the corresponding skill.

10. The method of claim 6 wherein the computing step includes multiplying the wait time measure for the call by a corresponding level in one or more of the categories.

11. The method of claim 1 further including the step of selecting one or more categories of levels for use at a particular time from a set of available categories of levels.

12. An apparatus for controlling a communication selection process in a call center, the apparatus comprising:
    a memory for storing information associating at least one category of levels with a plurality of skills supported by a given agent in the call center, the category including a level for each of at least a subset of the plurality of skills; and
    a processor coupled to the memory and operative to select a communication for handling by the agent based at least in part on a computation involving at least one of the levels.

13. The apparatus of claim 12 wherein the category of levels includes a speed category including levels indicative of the speed at which the agent can process calls for each of the corresponding skills.

14. The apparatus of claim 12 wherein the category of levels includes a yield category including levels indicative of results likely to be obtainable by the agent for each of the corresponding skills.

15. The apparatus of claim 12 wherein the category of levels includes a preference category including levels indicative of preferences of the agent for calls requiring each of the corresponding skills.

16. The apparatus of claim 12 wherein the processor is further operative to associate a plurality of different categories of levels with the plurality of skills supported by the agent.

17. The apparatus of claim 12 wherein the processor is further operative to compute a value for each of at least a subset of the plurality of skills, as a function of the corresponding level and a wait time measure for a call in a corresponding skill queue.

18. The apparatus of claim 17 wherein the wait time measure for the call is a current wait time for the call.

19. The apparatus of claim 17 wherein the wait time measure for the call is a predicted wait time for the call.

20. The apparatus of claim 17 wherein the wait time measure for the call is a ratio of a predicted wait time for the call to a service objective for the corresponding skill.

21. The apparatus of claim 17 wherein the processor is further operative to multiply the wait time measure for the call by a corresponding level in one or more of the categories.

22. The apparatus of claim 12 wherein the processor is further operative to select one or more categories of levels for use at a particular time from a set of available categories of levels.

23. An article of manufacture containing call center software which, when executed in a processor, causes the processor to perform the steps of:
    associating at least one category of levels with a plurality of skills supported by a given agent in the call center, the category including a level for each of at least a subset of the plurality of skills; and
    selecting a call for handling by the agent based at least in part on a computation involving at least one of the levels.

24. The article of manufacture of claim 23 wherein the category of levels includes at least one of a speed category, a yield category and a preference category.

* * * * *